(12) United States Patent
Lebowitz

(10) Patent No.: US 6,540,120 B2
(45) Date of Patent: Apr. 1, 2003

(54) KETTLE WITH IMPROVED OPENING MECHANISM

(75) Inventor: Samuel Lebowitz, Shelter Island, NY (US)

(73) Assignee: Wilton Industries, Inc., Woodridge, IL (US)

( * ) Notice: Subject to any disclaimer, the term of this patent is extended or adjusted under 35 U.S.C. 154(b) by 0 days.

(21) Appl. No.: 09/884,498

(22) Filed: Jun. 20, 2001

(65) Prior Publication Data

US 2003/0019889 A1 Jan. 30, 2003

(51) Int. Cl.[7] .............................................. B65D 83/00
(52) U.S. Cl. ....................................................... 222/471
(58) Field of Search ................................ 222/469–472, 222/556, 557; 220/318; 126/373.1, 388.1

(56) References Cited

U.S. PATENT DOCUMENTS

| | | | |
|---|---|---|---|
| 2,276,917 A | * 3/1942 | Bernhardt | .................. 222/470 |
| 2,501,142 A | 3/1950 | Reichart | |
| 2,624,493 A | 1/1953 | Porter | |
| 2,748,997 A | 6/1956 | Richmond, Sr. | |
| 3,130,881 A | 4/1964 | Jepson | |
| 3,341,088 A | * 9/1967 | Moynihan | .................. 222/440 |
| 3,469,747 A | 9/1969 | Richmond, Jr. | |
| 4,385,585 A | * 5/1983 | Lebowitz | .................. 116/67 R |
| 4,624,385 A | 11/1986 | Yano | |
| 4,813,368 A | * 3/1989 | Hutter et al. | ........... 116/137 R |
| 5,072,858 A | * 12/1991 | Brashier | .................. 222/144.5 |
| 5,135,128 A | 8/1992 | Kuhn | |
| 5,490,616 A | 2/1996 | Stowell et al. | |
| 6,006,959 A | 12/1999 | Naden et al. | |

* cited by examiner

Primary Examiner—Gene Mancene
Assistant Examiner—Stephanie Willatt
(74) Attorney, Agent, or Firm—Piper Rudnick

(57) ABSTRACT

A kettle has a handle with a channel formed therein. The channel houses a slider with a push trigger on one end and a toothed rack on the other. A compression spring is positioned between the channel and the slider. A ratchet tooth gear is connected to the kettle spout cover/whistle. The gear is pivotally connected to the handle. The toothed rack of the slider engages the ratchet tooth gear so that a force applied to the trigger moves the cover to the open position. The removal of such force causes the cover to move to the closed position under the influence of the compression spring. The kettle may include a stop that locks the cover/whistle in the open position.

20 Claims, 3 Drawing Sheets

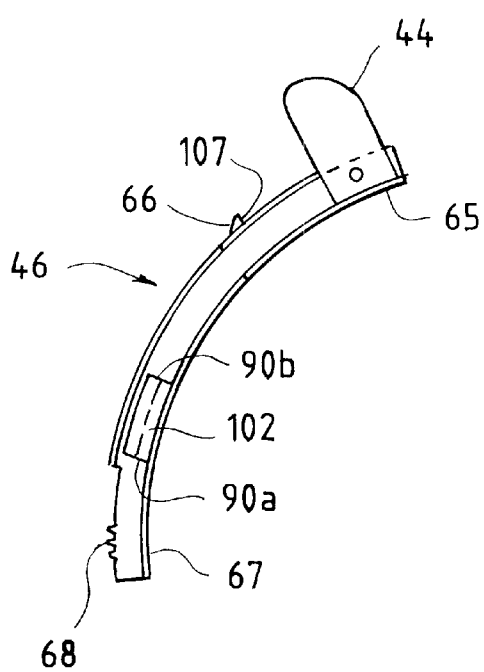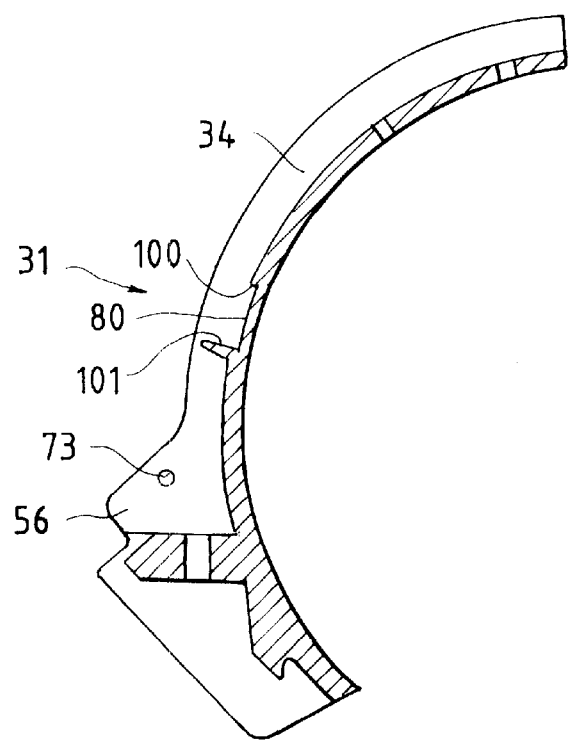

KETTLE WITH IMPROVED OPENING MECHANISM

BACKGROUND

The present invention generally relates to kettles for boiling liquids, and, more particularly, to a mechanism for opening and closing kettle spouts.

Kettles are well-known cooking vessels for boiling water, making tea or the like. The vessels commonly have a hollow body defining a reservoir chamber, a spout of some sort to pour liquid from the reservoir chamber, a cover covering the spout, a mechanism to open and close the spout cover, a handle of some shape so that the user can pour the liquid from the kettle and a separate refilling opening in the top of the body closed by a removable lid. For example, U.S. Pat. No. 3,130,881 to Jepson describes such a model. The tea kettle of the Jepson '881 patent features a mechanism whereby the user can depress a plunger and operate the spout cover. Unfortunately, the mechanism of the Jepson '881 patent locates the plunger near the spout. Such an arrangement is undesirable in that the user's hand could potentially be exposed to steam or hot water.

Some inventions attempted to solve this dilemma by moving the trigger for controlling the spout cover further away from the cover. For example, U.S. Pat. No. 5,490,616 to Stowell et al. illustrates a cover mechanism with a trigger further up on the handle of the kettle. While this arrangement decreases the chances of scalding, it does not provide the user much control over the raising and lowering of the spout cover because of the placement of the trigger that manipulates the cover. More specifically, the Stowell '616 patent positions the trigger beneath the handle and the user pulls the trigger back away from the spout to open the cover. As a result, a user is required to grab the handle and uncomfortably lift and pour the liquid from the kettle while, at the same time, pulling on the trigger in a direction opposite the weight of gravity to open the cover. Moreover, the Stowell '616 patent does not provide any means to modulate the cover opening. Instead, the Stowell '616 patent describes a cover hingedly attached to the spout which allows for movement solely in the fully open or fully closed positions. As such, the user has very little control over the breadth of the opening of the cover and, therefore, the amount of liquid flowing from the kettle.

Likewise, U.S. Pat. No. 6,006,959 to Naden et al. illustrates a kettle with a handle, which is used to open and close the kettle cover. This design also protects the user from the scalding because the handle is at a distance from the spout cover, but the design, similar to the Stowell '616 patent, does not provide the user with much control or manageability of the opening. Specifically, the Naden '959 patent describes a handle attached to a leaf spring whereby the user grasps the handle itself and pulls it toward himself or herself while holding the kettle in the other hand. This arrangement requires the user to use his or her entire hand to manipulate the handle to move the cover into the open or closed position. This awkward motion decreases the user's ability to balance the kettle properly, which leads to over or under pouring. Furthermore, systems that primarily rely on a spring-loaded mechanism, like the one in the Naden '959 patent, to both open and close the cover, lack an accurate means to regulate the breadth of the opening of the cover. As such, use of this type of mechanism also leads to over or under pouring. Moreover, such heavy reliance on the spring as the primary mechanism to operate the cover in both directions leads to the spring becoming distended and dysfunctional after prolonged use of the kettle. Such an occurrence prevents proper closure of the cover, which in turn, leads to heat loss and a decrease in the thermal efficiency of the kettle.

Accordingly, it is an object of the present invention to provide a kettle with an improved opening mechanism that offers the user increased protection from steam and hot liquids.

It is a further object of the present invention to provide a kettle with an improved opening mechanism that enables the spout cover to be locked in the open position.

It is still a further object of the invention to provide a kettle with an improved opening mechanism that provides an expedient closure of the cover.

It is still a further object of the invention to provide a kettle with an improved opening mechanism that is economical to manufacture.

SUMMARY OF THE INVENTION

The present invention is a kettle with an improved opening mechanism. In particular, the invention provides a kettle with a handle covered by an insulating material with a slot formed in the insulating material. Positioned within the slot is a trigger that a user can modulate to control the opening and closing of the kettle spout cover. The handle features a base portion wherein a slider channel and a tab channel are formed. The trigger is located on the second end or distal portion of a slider, which is positioned in the slider channel. On the first end or proximal portion of the slider is a toothed rack. In addition, the slider includes a hollowed area. This hollowed area opposes a notched area in the slider channel. A compression spring is positioned within the hollowed area and engages an end of the slider hollowed area and a spring engagement member defined by the notched area of the slider channel to limit travel of the slider and urge the slider towards a position whereby the cover of the kettle is closed.

The toothed rack of the slider engages a ratchet tooth gear. The ratchet tooth gear is attached to a tab that extends from a ring encircling the spout cover or whistle of the kettle. The tab sits in the tab channel of the handle. The tab is pivotally connected to the handle so that the ratchet tooth gear rotates about an axis whereby the whistle may be raised or lowered. As the user applies pressure to the trigger, the toothed rack and the ratchet tooth gear operate so that the user can easily and safely open the whistle. Moreover, as the user applies such pressure, the compression spring of the slider compresses. An open cover stop automatically locks the whistle into the open position. The force of the uncoiling of the compression spring quickly, efficiently and firmly closes the cover when the trigger and stop are released.

BRIEF DESCRIPTION OF THE DRAWINGS

FIG. 3 is an enlarged view of the handle base portion of the kettle of FIG. 1; and FIG. 4 is an enlarged view of the slider of the kettle of FIG. 1.

DETAILED DESCRIPTION OF THE PREFERRED EMBODIMENT

Figure 1:
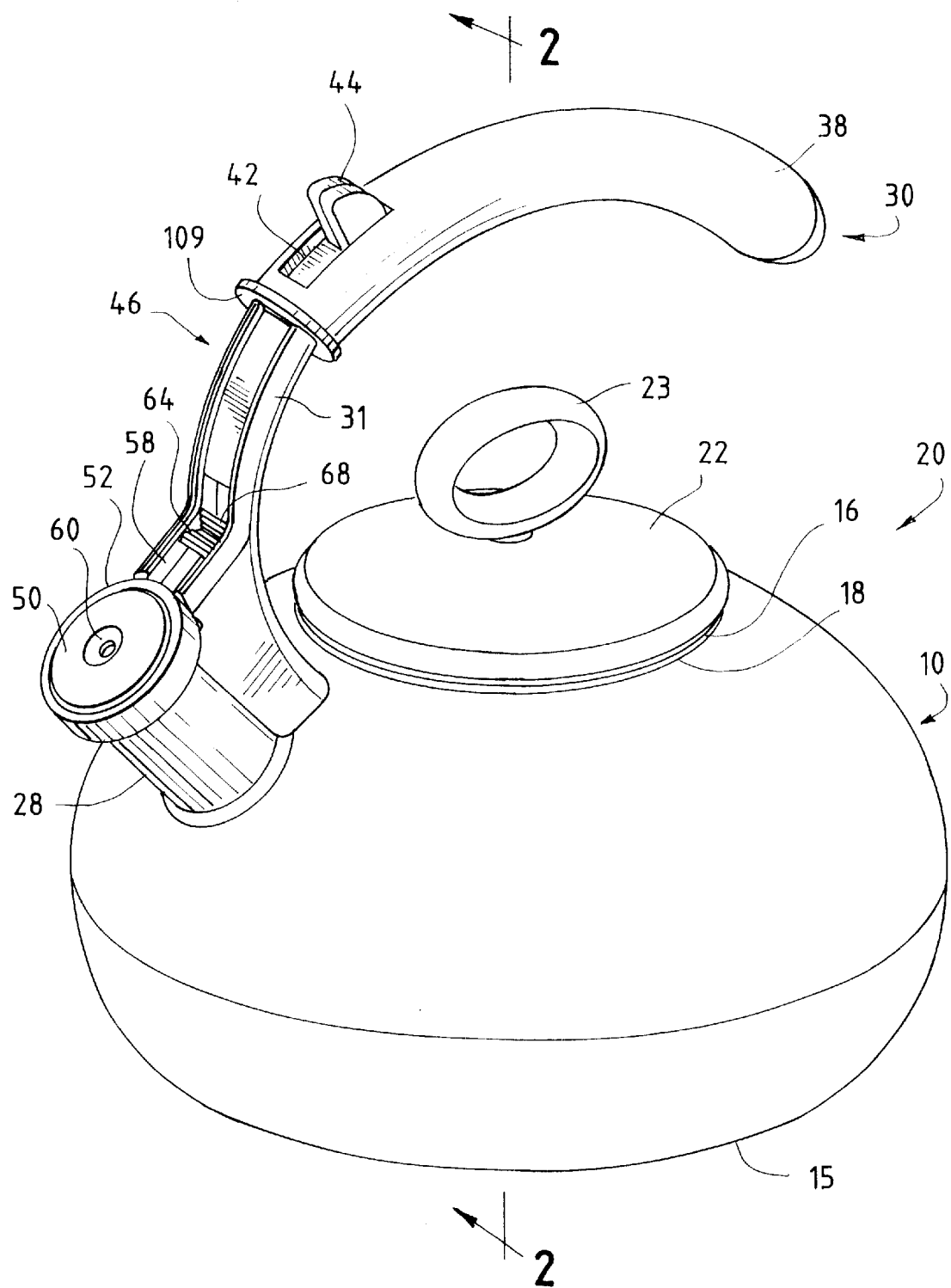
FIG. 1 is a perspective view of an embodiment of the kettle of the present invention where the spout cover is in the closed position.
Figure 2:
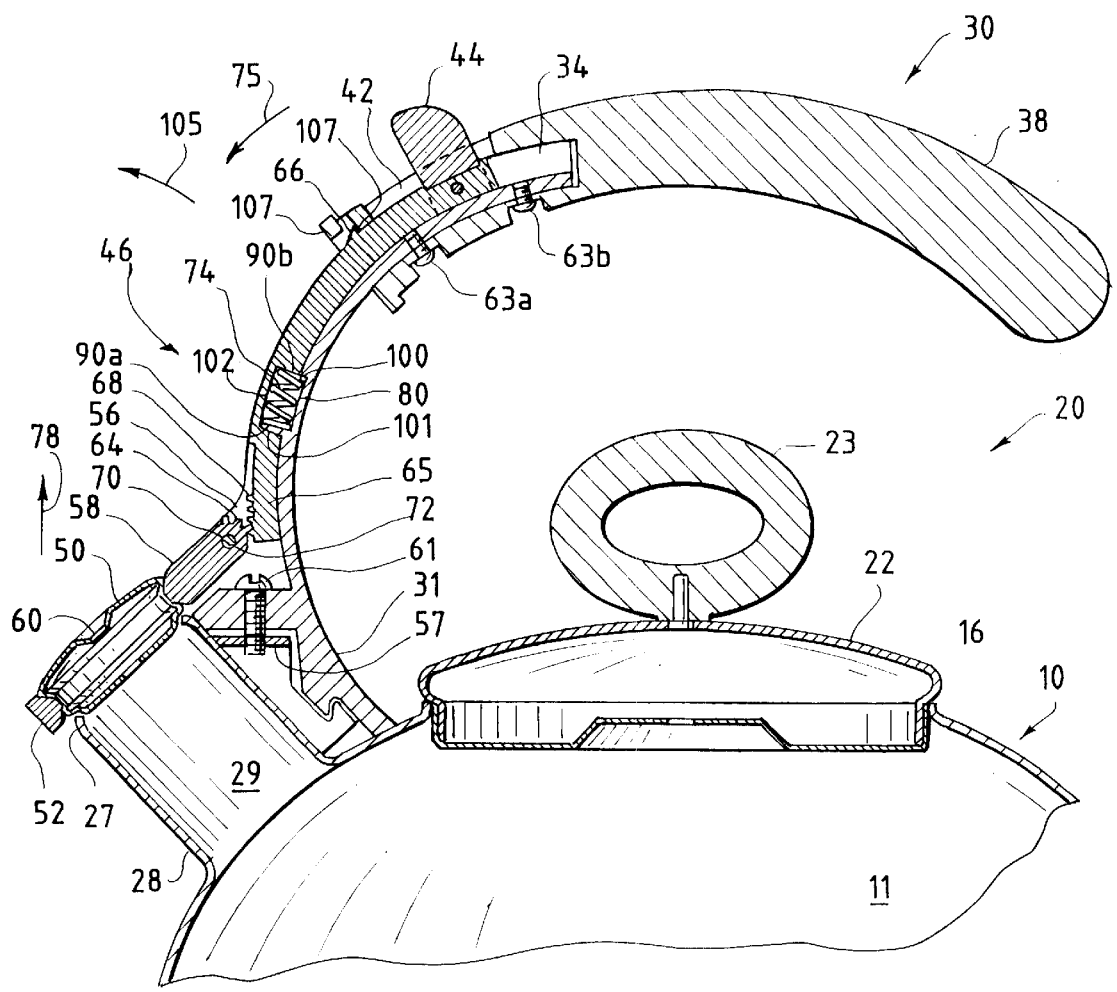
FIG. 2 is an enlarged sectional view of the upper portion of the kettle of FIG. 1 taken along line 2—2.

Referring to the FIGS. 1 and 2, a kettle constructed in accordance with the present invention is indicated in general at 20. The kettle has a hollow, spherical shaped body indicated in general at 10, defining a holding chamber 11 (FIG. 2) therein. The spherical body 10 has a flat bottom portion 15. The chamber 11 has a refilling opening 16 whereby the kettle 20 is filled with liquid. The refilling opening 16 is encircled by a ring 18 preferably constructed of metal, that engages a lid 22 so that the liquid does not spill out of the chamber 11. The lid 22 includes a knob 23 made of an insulating material, such as plastic or rubber.

The kettle also features a cylindrical spout 28. As illustrated in FIG. 2, the spout 28 defines a passage 29 that communicates with the kettle chamber 11. The spout 28 includes a port 27 that is closed by a cover such as whistle 50. A ring 52 made of insulating material such as rubber or plastic encircles the whistle 50. At the center of the whistle 50 is a recessed aperture 60 from which the steam from the boiling liquid in the holding chamber 11 exits the kettle 20. In particular, as the liquid in the holding chamber 11 boils, steam is created. The steam flows out of the holding chamber 11, through the spout passage 29 and through the recessed aperture 60 at the center of the whistle 50. As the steam exits the aperture 60, a whistling sound is produced alerting the user that the liquid in the kettle 20 has begun to boil. At that point, the user typically pours the heated liquid from the kettle 20 through the spout 28.

As seen in FIGS. 1 and 2, the spout 28 and the spherical body 10 of the kettle are attached to a cantilever-shaped handle, indicated in general at 30. The handle includes a base portion 31 that is preferably constructed of metal. As illustrated in FIG. 2, the base portion 31 is attached to the spout 28 via bracket 57 and screw 61.

As illustrated in FIG. 3, the handle base portion, indicated in general at 31, includes two channels, a slider channel 34 and a tab channel 56. As illustrated in FIG. 2, the distal portion of the slider channel 34 is covered by an insulating material 38 such as rubber or plastic. The insulating material 38 has a slot 42 formed therein over a portion of the slider channel 34. The insulating material is preferably secured to the base portion 31 of the handle 30 by screws 63a and 63b. As illustrated in FIG. 3, the slider channel 34 of the base handle portion 31 also includes a notched area 80 that defines a shoulder 100 and a spring engagement member 101.

With reference to FIGS. 1 and 2, a tab 58 extends from the outer ring 52 that encircles the spout cover or whistle 50. The tab 58 is positioned within the tab channel 56 of handle base portion 31. A gear, preferably a ratchet tooth gear 64, is positioned upon the end of the tab 58. A worm gear or a variety of other types of gears may be substituted for the ratchet tooth gear 64. As illustrated in FIG. 2, the tab 58 includes an aperture 70 that accommodates a pin 72. The pin 72 connects the tab 58 to a handle aperture, indicated at 73 in FIG. 3, formed in the base portion 31 of the handle.

As illustrated in FIG. 4, a curved slider, indicated in general at 46, includes a trigger 44 located on its second or distal end 65 and a toothed rack 68 located on its first or proximal end 67. In addition, an open cover stop 66 is attached or molded to the slider and a hollowed area 102, having first and second ends 90a and 90b, respectively, is formed in the slider between the rack 68 and trigger 44.

With reference to FIG. 2, the slider channel 34 houses the curved slider, indicated in general at 46, with the trigger 44 positioned within the slot 42 of the insulating material 38. In addition, the toothed rack 68 of the curved slider 46 is in mechanical communication with the ratchet tooth gear 64 that is connected to whistle 50 via tab 58. The hollowed area 102 of curved slider 46 opposes the notched area 80 in the slider channel 34 of the handle base portion 31. A compression spring 74 is positioned within the hollowed area 102 and engages the second end 90b of the hollowed area 102 of the slider 46 and the spring engagement member 101 of the handle base member 31.

In operation, the user grasps the handle 30 on the insulated portion 38 and applies a force to the trigger 44 in the direction indicated by arrow 75 in FIG. 2 with his or her thumb. As a result, the curved slider 46 moves towards spout 28. As the curved slider 46 slides towards spout 28, the toothed rack 68 engages the ratchet tooth gear 64. The movement of the ratchet tooth gear 64 raises the whistle 50 in the direction indicated by arrow 78 by rotating the tab 58 clockwise about the pin 72. In addition, the open cover stop 66 of the slider 46 travels out from under the insulated material 38.

As the curved slider 46 moves in the direction indicated by arrow 75 (FIG. 2), the compression spring 74 is compressed between the second end 90b of the hollowed area 102 of the curved slider 46 and the spring engagement member 101 of the slider channel 34. In addition to lightly resisting the motion of the trigger as the whistle is opened, the interaction between spring 74, channel spring engagement member 101 and slider second end 90b urges the curved slider 46 in the direction of arrow 105 in FIG. 2.

When the user's thumb is removed from trigger 44, the compression spring 74 causes the curved slider 46 to slide away from spout 28 until the back side 107 of the open cover stop engages the edge 109 of insulation material 38. As a result, the spout cover/whistle 50 is secured or locked in the open position. The user releases the opened whistle from the locked position by pushing on the trigger 44 in the direction opposite of arrow 105 (FIG. 2). At this point, the action of compression spring 74 on channel spring engagement member 101 and slider second end 90b forces the slider 46 further away from spout 28 until the spring engagement member 101 of slider channel 34 engages the first wall 90a of curved slider 46. At this point, the slider is in its original position, illustrated in FIG. 2, with the spout cover/whistle closed.

What is claimed is:

1. A kettle comprising:
   a) a body defining a holding chamber;
   b) a spout featuring a port that is in communication with the holding chamber;
   c) a cover pivotally attached to the spout so that the cover is movable between a closed position where the cover covers the port and an opened position;
   d) a gear attached to the cover;
   e) a ring made of an insulating material, said ring surrounding said cover and having a tab extending therefrom with the gear emanating from the tab;
   f) a handle attached to the body proximate to the spout, the handle having a slider channel formed therein;
   g) a slider featuring a first end having a rack and a second end having a trigger;
   h) the slider positioned in a sliding fashion within the slider channel of the handle with the gear of the cover operatively engaging the rack of the slider so that movement of the trigger of the slider by a user causes the cover to be moved between the opened and closed positions; and
   i) a spring disposed between the slider and the slider channel, the spring urging the slider towards a position where the cover is closed.

2. The kettle of claim 1, wherein the gear is a ratchet tooth gear.

3. The kettle of claim 1, wherein the cover is pivotally attached to the spout by a pin and the gear rotates around the pin as the cover is moved between the opened and closed positions.

4. The kettle of claim 1, wherein the handle has a base portion with a tab channel formed therein where the tab channel houses the tab.

5. The kettle of claim 1, wherein the handle is cantilever-shaped and has a base portion with a tab channel formed therein where the tab channel houses the tab.

6. The kettle of claim 1, wherein the slider includes a hollowed area having an end and the slider channel includes a spring engagement member, said spring positioned within the hollowed area of the slider and engaging the end of the hollowed area and the spring engagement member of the slider channel.

7. The kettle of claim 6 wherein the spring is a compression spring.

8. The kettle of claim 1, wherein the cover is a whistle.

9. The kettle of claim 1, wherein the cover is pivotally attached to the spout by a pin and the gear rotates around the pin.

10. A kettle comprising:
  a) a body defining a holding chamber;
  a spout featuring a port that is in communication with the holding chamber;
  c) a cover pivotally attached to the spout so that the cover is movable between a closed position where the cover covers the port and an opened position;
  d) a gear attached to the cover;
  e) a handle attached to the body proximate to the spout, the handle having a slider channel formed therein, wherein a portion of the handle is covered by insulating material;
  f) a slider featuring a first end having a rack and a second end having a trigger, wherein the insulating material includes an edge positioned adjacent to the slider channel and said slider includes a stop formed thereon, said stop positioned under the insulating material when the cover is in the closed position and engaging the edge of the insulating material when the cover is in the open position;
  g) the slider positioned in a sliding fashion within the slider channel of the handle with the gear of the cover operatively engaging the rack of the slider so that movement of the trigger of the slider by a user causes the cover to be moved between the opened and closed positions; and
  h) a spring disposed between the slider and the slider channel, the spring urging the slider towards a position where the cover is closed.

11. The kettle of claim 10, wherein the insulating material has a slot and the trigger of the slider is positioned in the slot.

12. The kettle of claim 10, wherein the cover is pivotally attached to the spout by a pin and the gear rotates around the pin as the cover is moved between the opened and closed positions.

13. The kettle of claim 10, wherein the handle is cantilever-shaped and has a base portion with a tab channel formed therein where the tab channel houses the tab.

14. The kettle of claim 10, wherein the slider includes a hollowed area having an end and the slider channel includes a spring engagement member, said spring positioned within the hollowed area of the slider and engaging the end of the hollowed area and the spring engagement member of the slider channel.

15. An apparatus for opening and closing a pour spout cover where the pour spout cover is pivotally connected to a kettle, the apparatus comprising:
  a) a gear attached to the cover;
  b) a ring made of an insulating material, said ring surrounding said cover and having a tab extending therefrom with the gear emanating from the tab;
  c) a handle attached to the kettle proximate to the spout, the handle having a slider channel formed therein;
  d) a slider featuring a first or proximal end having a rack and a second or distal end having a trigger;
  e) the slider positioned in a sliding fashion within the slider channel of the handle with the gear of the cover operatively connected to the rack of the slider so that movement of the trigger of the slider by a user causes the cover to be moved between the opened and closed positions; and
  f) a spring disposed between the slider and the slider channel, the spring urging the slider towards a position whereat the cover is closed.

16. The apparatus of claim 15, wherein the cover is pivotally attached to the spout by a pin and the gear rotates around the pin as the cover is moved between the opened and closed positions.

17. The apparatus of claim 15, wherein the handle is cantilever-shaped and has a base portion with a tab channel formed therein where the tab channel houses the tab.

18. The apparatus of claim 15, wherein a portion of the handle is covered by insulating material.

19. The kettle of claim 18 wherein the insulating material includes an edge positioned adjacent to the slider channel and said slider includes a stop formed thereon, said stop positioned under the insulating material when the cover is in the closed position and engaging the edge of the insulating material when the cover is in the open position.

20. The apparatus of claim 15, wherein the cover is a whistle.

* * * * *